US010621624B2

(12) United States Patent
Beaven et al.

(10) Patent No.: US 10,621,624 B2
(45) Date of Patent: Apr. 14, 2020

(54) LIVE AUCTION ADVERTISEMENTS FOR SMART SIGNS

(71) Applicant: Xevo Inc., Kirkland, WA (US)

(72) Inventors: Travis Lee Beaven, Woodinville, WA (US); Christi Teresa McCorkle, Orlando, FL (US)

(73) Assignee: Xevo Inc., Bellevue, WA (US)

( * ) Notice: Subject to any disclaimer, the term of this patent is extended or adjusted under 35 U.S.C. 154(b) by 763 days.

(21) Appl. No.: 15/244,971

(22) Filed: Aug. 23, 2016

(65) Prior Publication Data

US 2018/0060920 A1    Mar. 1, 2018

(51) Int. Cl.
*G06Q 30/02*    (2012.01)
*G06F 3/147*    (2006.01)

(52) U.S. Cl.
CPC ......... *G06Q 30/0275* (2013.01); *G06F 3/147* (2013.01); *G06Q 30/0267* (2013.01); *G06Q 30/0269* (2013.01); *G06Q 30/0272* (2013.01); *G09G 2370/022* (2013.01); *G09G 2370/04* (2013.01); *G09G 2370/16* (2013.01); *G09G 2380/06* (2013.01)

(58) Field of Classification Search
CPC ..................................................... G06Q 30/02
USPC ............. 705/14.67, 339; 715/740; 348/14.01
See application file for complete search history.

(56) References Cited

U.S. PATENT DOCUMENTS

| 9,047,054 | B1 | 6/2015 | Goldstein et al. |
| 9,471,567 | B2 | 10/2016 | Duyaguit |
| 9,785,632 | B1 | 10/2017 | Beaven et al. |
| 2009/0138353 | A1 | 5/2009 | Mendelson |
| 2009/0210303 | A1* | 8/2009 | Perry ...................... G06Q 30/02 705/14.67 |
| 2010/0291968 | A1 | 11/2010 | Ander et al. |
| 2011/0183644 | A1 | 7/2011 | Gupta |
| 2012/0069131 | A1* | 3/2012 | Abelow ............... G06Q 10/067 348/14.01 |
| 2013/0099919 | A1 | 4/2013 | Cai et al. |
| 2013/0165151 | A1 | 6/2013 | Gits et al. |
| 2014/0019377 | A1* | 1/2014 | Bhaumik ........... G06Q 30/0641 705/339 |
| 2014/0159910 | A1 | 6/2014 | Lee et al. |

(Continued)

*Primary Examiner* — Marilyn G Macasiano

(57) ABSTRACT

Embodiments are directed towards a smart sign that provides dynamic content auctions based on device-specific information obtained from mobile devices in proximity of the smart sign. Device-information requirements and content are received from content providers. The device-information requirements include target device-specific information and a price that the content provider is willing to pay to have its content displayed when the target device-specific information is received from a mobile device. Device-specific information is received from each mobile device in the proximity of the smart sign. The auction for the smart sign is performed by comparing the device-specific information to the device-information requirements for the content providers. Third-party content, e.g., advertisement, is selected for the content provider that paid a highest amount of money for the device-information requirements that match the device-specific information. User-specific content is generated and displayed on the smart sign based on the selected third-party content.

13 Claims, 9 Drawing Sheets

(56) References Cited

U.S. PATENT DOCUMENTS

| | | | |
|---|---|---|---|
| 2015/0169189 A1* | 6/2015 | Want | G06Q 30/02 |
| | | | 715/740 |
| 2015/0287295 A1 | 10/2015 | Trivelpiece et al. | |
| 2016/0037924 A1 | 2/2016 | Bromley | |
| 2016/0180663 A1 | 6/2016 | McMahan et al. | |
| 2016/0203643 A1 | 7/2016 | Kim et al. | |
| 2016/0284174 A1 | 9/2016 | Connell, II | |
| 2017/0351470 A1 | 12/2017 | Beaven et al. | |
| 2018/0095631 A1 | 4/2018 | Muta | |

\* cited by examiner

| Third-party content provider | Device-information requirements | | | Content |
|---|---|---|---|---|
| | Bid amount | Device-specific information | Number of Devices | |
| Store_A | $5.00 | Application_A | 4 or more | Content_1 |
| Store_A | $1.00 | Male, age 30-40 | 1 | Content_2 |
| Store_B | $3.00 | Application_A | 3 | Content_3 |
| Store_C | $2.00 | Application_E | 1 | Content_4 |
| Restaurant_A | $3.00 | Application_B and Female | 2 | Content_5 |
| Restaurant_B | $4.00 | Application_B and Male | 2 | Content_6 |
| Restaurant_B | $7.00 | Application_C and Application_D | 1 | Content_7 |
| Restaurant_B | $2.00 | Application_B or Application_C | 3 | Content_8 |

FIG. 2

LIVE AUCTION ADVERTISEMENTS FOR SMART SIGNS

BACKGROUND

Technical Field

The present disclosure relates generally to the dynamic, real-time display of content on a smart sign based on information associated with users in proximity to the sign.

Description of the Related Art

Electronic display signs are quickly replacing traditional posters and billboards as the primary way to provide information to people. Many new malls, stores, airports, stadiums, arenas, sporting venues, zoos, amusement parks, and other public places are being equipped with electronic display signs rather than relying on traditional posters and billboards to convey information to the public. These electronic display signs allow an advertiser or merchant to change the information that is being displayed from week-to-week, day-to-day, or even hour-to-hour, but the information is often static and targeted to a general audience while it is being displayed. It is with respect to these and other considerations that the embodiments described herein have been made.

BRIEF SUMMARY

Briefly stated, embodiments are directed towards a smart sign that provides dynamic auctions of third-party content based on device-specific information obtained from mobile communication devices that are in proximity of the smart sign. By performing live, real-time auctions based on information from mobile communication devices that are near the smart sign, the smart sign can display content that is targeted at users of those mobile communication devices.

Each of a plurality of third-party content providers provides one or more bids or device-information requirements to use in the auction. The device-information requirements for each respective content provider includes target device-specific information and a price that the respective content provider is willing to pay to have its content displayed on the smart sign when the target device-specific information is received from a mobile communication device in the proximity of the smart sign. In some embodiments, the device-information requirements also include a target number of mobile communication devices that need to be in the proximity of the smart sign, which have the target device-specific information before content associated with those device-information requirements is displayed on the smart sign. Each content provider also provides third-party content for one or more device-information requirements. Accordingly, when a content provider's device-information requirements are met and the content provider wins the auction bid, then that content provider's content that corresponds to the winning device-information requirements is displayed on the smart sign.

The smart sign includes a display device that displays content, including visual content, and a proximity sensor to determine when one or more mobile communication devices is in the proximity of the smart sign or in the field-of-view area of the display device. As mobile communication devices enter or exit the proximity of the smart sign, device-specific information is received from each mobile communication device(s) that is determined to be currently in the proximity of the smart sign.

The auction for the smart sign is performed to determine which content provider bid a highest amount of money to have its content displayed on the smart sign for the device-specific information received from the mobile communication device(s) in the proximity of the smart sign. In various embodiments, the device-specific information is compared to the device-information requirements for the plurality of content providers. Third-party content, such as an advertisement, is selected for the content provider that paid a highest amount of money for the device-information requirements that match the received device-specific information. In some embodiments, a subset of content providers that bid on device-information requirements that match the device-specific information is identified. The content provider in this subset that offered the largest amount of money for the device-information requirements that match the device-specific information is selected as the winner of the auction, and its content is selected for display. In response to the results of the auction, user-specific content is generated for a user of the mobile communication device(s) in the proximity of the smart sign based on the selected third-party content. The smart sign then displays the user-specific content.

In various embodiments, device-specific information from a plurality of mobile communication devices that are in the proximity of the smart sign is aggregated. This aggregated device-specific information is then compared to the device-information requirements provided by the plurality of content providers. For example, the device-information requirements for some of the content providers may indicate a minimum number of mobile communication devices greater than one that must be in the proximity of the smart sign and have the same device-specific information before its content is displayed on the smart sign. In other embodiments, the user-specific content may be modified based on user interactions with the smart sign. For example, if a user clicks on the third-party content, or other displayed content, another auction may be performed based on a combination of the interaction along with the device-information requirements.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 2 shows a use case example of device-information requirements for a plurality of third-party content providers in accordance with embodiments described herein;

DETAILED DESCRIPTION

Figure 1:
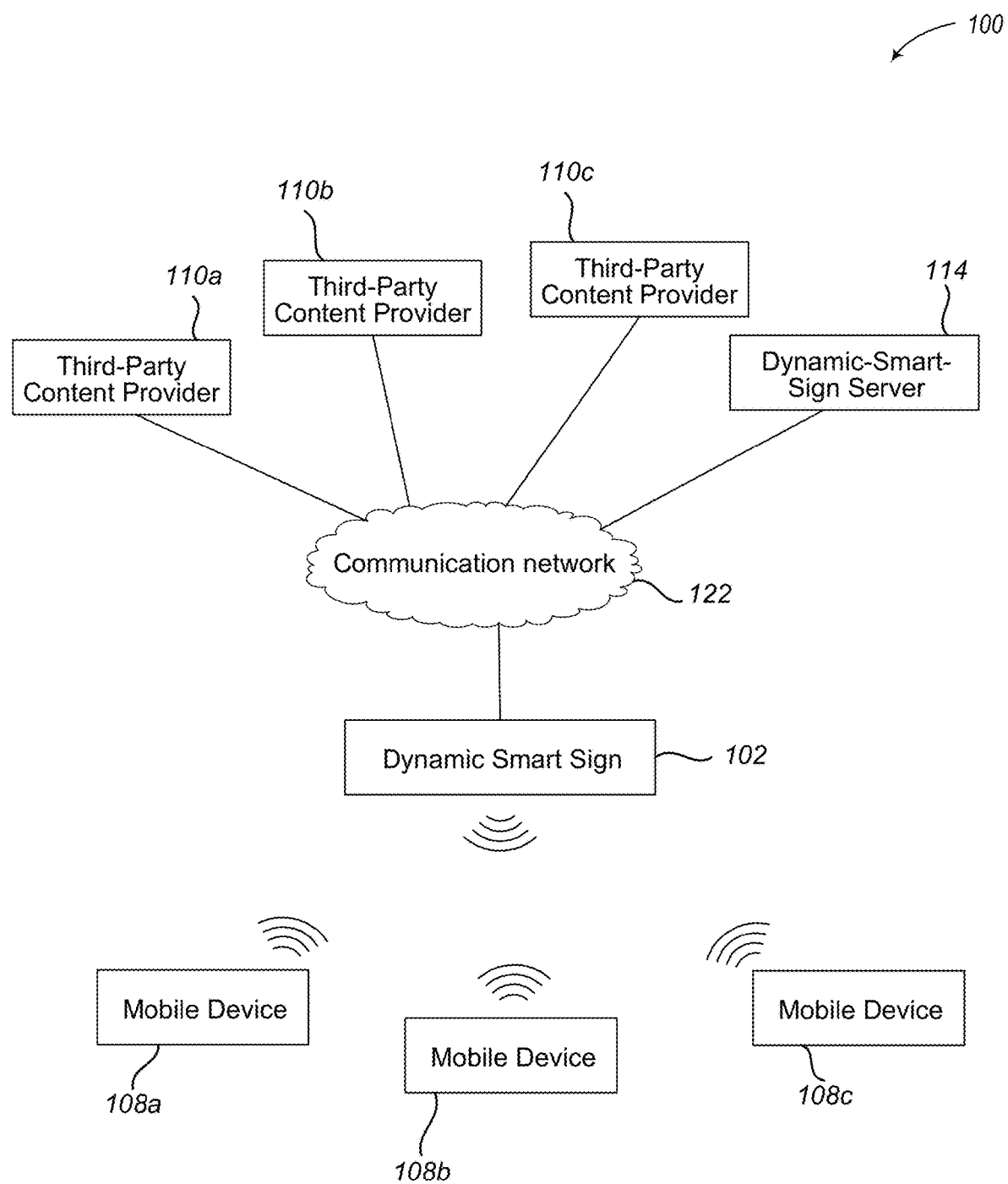
FIG. 1 illustrates a context diagram of an environment where a dynamic smart sign communicates with multiple mobile communication devices that are in close proximity to the sign to provide targeted auctioned advertisements to the users of those devices in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The terms "smart sign," "dynamic smart sign," "dynamic smart display device," "electronic display sign," or "sign" refer to a display device that can detect mobile communication devices that are in a close proximity to the device and dynamically change the content being displayed on the device based on device-specific information or other characteristics of the detected mobile communication devices. Smart signs may be standalone devices or they may be combined with other electronic devices, and they may be employed in a variety of different situations, settings, or environments. For example, in some embodiments, smart signs may include freestanding or wall hanging smart signs used in malls, stores, airports, stadiums, arenas, sporting venues, zoos, amusement parks, hotel lobbies, cruise ships, retail shops, or other locations where information is provided to people. In some other embodiments, the smart signs may be utilized in other electronic devices, such as, but not limited to, a television in a hotel room or cruise-ship cabin, a head unit in an automobile, a heads-up display in an airplane seat, or other electronic devices.

The term "content" refers to information that can be displayed on a smart sign. Content may include visual content, such as, but not limited to, text, graphics, symbols, video, or other information that is provided to a user on the smart sign. In some embodiments, the content may also include audio content. In various embodiments, the content is an advertisement for a product or service. User-specific content refers to content that is selected, modified, generated, or otherwise determined for a specific user based on device-specific information obtained from a mobile communication device of that user. In various embodiments, the user-specific content is an advertisement that is selected specifically for the specific user based on a result of an auction among advertisers to provide an advertisement to a person with the device-specific information associated with that person. User-specific content can be overlaid or added to the default content of a smart sign, supplement the default content of the smart sign, replace the default content or other content on the smart sign, or be otherwise displayed on the smart sign.

FIG. 1 illustrates a context diagram of an environment where a dynamic smart sign communicates with multiple mobile communication devices that are in close proximity to the sign to provide targeted auctioned advertisements to the users of those devices in accordance with embodiments described herein. Environment 100 includes a dynamic smart sign 102, a plurality of mobile communication devices 108a-108c, also referred to as mobile devices, and plurality of third-party content providers 110a-110c. In various embodiments, the environment 100 may also include a dynamic-smart-sign server 114.

The dynamic smart sign 102 is an auction-based system to determine what content to display on a display screen of the smart sign. The dynamic smart sign 102 communicates with one or more mobile communication devices 108a-108c as those mobile communication devices enter or come into close proximity to the dynamic smart sign 102. In the illustration, the dynamic smart sign 102 is communicating with mobile communication devices 108a, 108b, and 108c. It should be understood that at any given point in time, the dynamic smart sign 102 may be communicating with zero, one, or a plurality of mobile communication devices that are in proximity to the dynamic smart sign 102. Similarly, there may be a plurality of dynamic smart signs (not illustrated) that each communicate with one or more mobile communication devices that are in proximity to each respective smart sign.

As mobile communication devices 108 enter and exit the proximity of the dynamic smart sign 102, the dynamic smart sign 102 communicates with each mobile communication device 108 currently in that proximity to receive device-specific information from each respective mobile communication device 108. As mentioned elsewhere herein, the device-specific information may identify applications installed or executing on the mobile communication device, personal information or characteristics of a user of the mobile communication device, or other characteristics of the mobile communication device. The dynamic smart sign 102 utilizes the device-specific information of each mobile communication device 108 that is in its proximity to display user-specific content to the users of the mobile communication devices 108. In various embodiments, the dynamic smart sign 102 may also determine a location of each mobile communication device 108 relative to dynamic smart sign 102, which may be used to modify how the user-specific content is displayed on the dynamic smart sign 102.

The dynamic smart sign 102 utilizes the received device-specific information to perform an auction to determine which third-party content to display to the user(s) of the mobile communication devices 108. In various embodiments, each of plurality of third-party content providers 110*a*-110*c* provides one or more device-information requirements to the dynamic smart sign 102, which may also be referred to as bids for the auction. The device-information requirements may be stored on the dynamic smart sign 102 or on a dynamic-smart-sign server 114. The device-information requirements for each third-party content provider 110 identify which device-specific information the respective third-party content provider 110 is interested in and how much money that content provider is willing to pay to have its content displayed on the dynamic smart sign 102 when the corresponding device-specific information is received from the mobile communication devices 108. FIG. 2 illustrates a sample use case chart of device-information requirements for a plurality of third-party content providers 110.

When the dynamic smart sign 102 receives device-specific information from one or more mobile communication devices 108, it compares this received information with the device-information requirements provided by the third-party content providers 110. If there is a match, then content for the third-party content provider 110 associated with the matched device-information requirement is selected for display on the dynamic smart sign 102. In some embodiments, two or more device-information requirements might match the received device-specific information. In this case, the device-information requirement with the highest bid amount is the winner and content for the third-party content provider 110 associated with this device-information requirement is selected for display on the dynamic smart sign 102.

In some embodiments, the dynamic smart sign 102 communicates with a dynamic-smart-sign server 114. In various embodiments, the dynamic-smart-sign server 114 receives, stores, and maintains the device-information requirements and the third-party content for each third-party content provider 110. In some embodiments, the dynamic smart sign 102 can request the device-information requirements or the third-party content from the dynamic-smart-sign server 114 based on the device-specific information received from the mobile communication devices 108. In other embodiments, the dynamic smart sign 102 may provide the device-specific information regarding the mobile communication devices in its proximity to the dynamic-smart-sign server 114. In at least one such embodiment, the dynamic-smart-sign server 114 may employ embodiments described herein to perform the third-party content auction and provide the resulting third-party content to the dynamic smart sign 102 for display on the dynamic smart sign 102. It should be understood that the dynamic-smart-sign server 114 may be optional and the dynamic smart sign 102 may store the device-information requirements and third-party content on the dynamic smart sign 102, and may perform the third-party content auction as described herein without the use of the dynamic-smart-sign server 114.

In various embodiments, the dynamic smart sign 102, the third-party content providers 110, and the dynamic-smart-sign server 114 may communicate with each other via a communication network 122. The communication network 122 may be configured to couple various computing devices to transmit data from one or more devices to one or more other devices. The communication network 122 includes various wired or wireless networks that may be employed using various forms of communication technologies and topologies, such as, but not limited to, cellular networks, mesh networks, or the like.

The mobile communication device 108 can be a cell phone; mobile phone; smart phone; tablet computer; portable personal computer; Wi-Fi, Bluetooth, or other short range communication enabled electronic device; or any other electronic device that is mobile and can communicate by some wireless method with other devices.

FIG. 2 shows a use case example of device-information requirements for a plurality of third-party content providers in accordance with embodiments described herein. In this example, table 200 includes third-party content providers 202, device-information requirements 204, and content 206. In this illustration, the device-information requirements 204 includes a bid amount 210, device-specific information 212, and the number of devices 214 that need to be in the proximity of the smart sign and provide the device-specific information 212 before the bid amount 210 will be placed in the auction.

Each row in the table 200 is a different bid 216 for a third-party content provider 202. Accordingly, third-party content providers 202 can provide one or more bids 216, which may be with one or more different device-information requirements 204. For example, Store_A has two bids for different device-specific information 212, one bid for Application_A and one bid for males between the ages of 30 and 40. In this example, each bid 216 has corresponding content 206 to be displayed on the smart sign when the device-information requirements are met for that particular bid. The content for each separate bid 216 may be different or a third-party content provider 202 can provide different content 206 for each bid 216. For example, Content_1 and Content_2 may be the same advertisement for Store_A or they may be different advertisements.

It should be understood that table 200 is for illustrative purposes and should not be considered exhaustive or limiting. For example, the device-information requirements 204 in the table 200 may include additional information that is not shown. In some embodiments, each bid 216 may include a device-information requirement 204 identifying a user interaction with the smart sign for the corresponding bid, as described in more detail elsewhere herein.

Figure 3A:
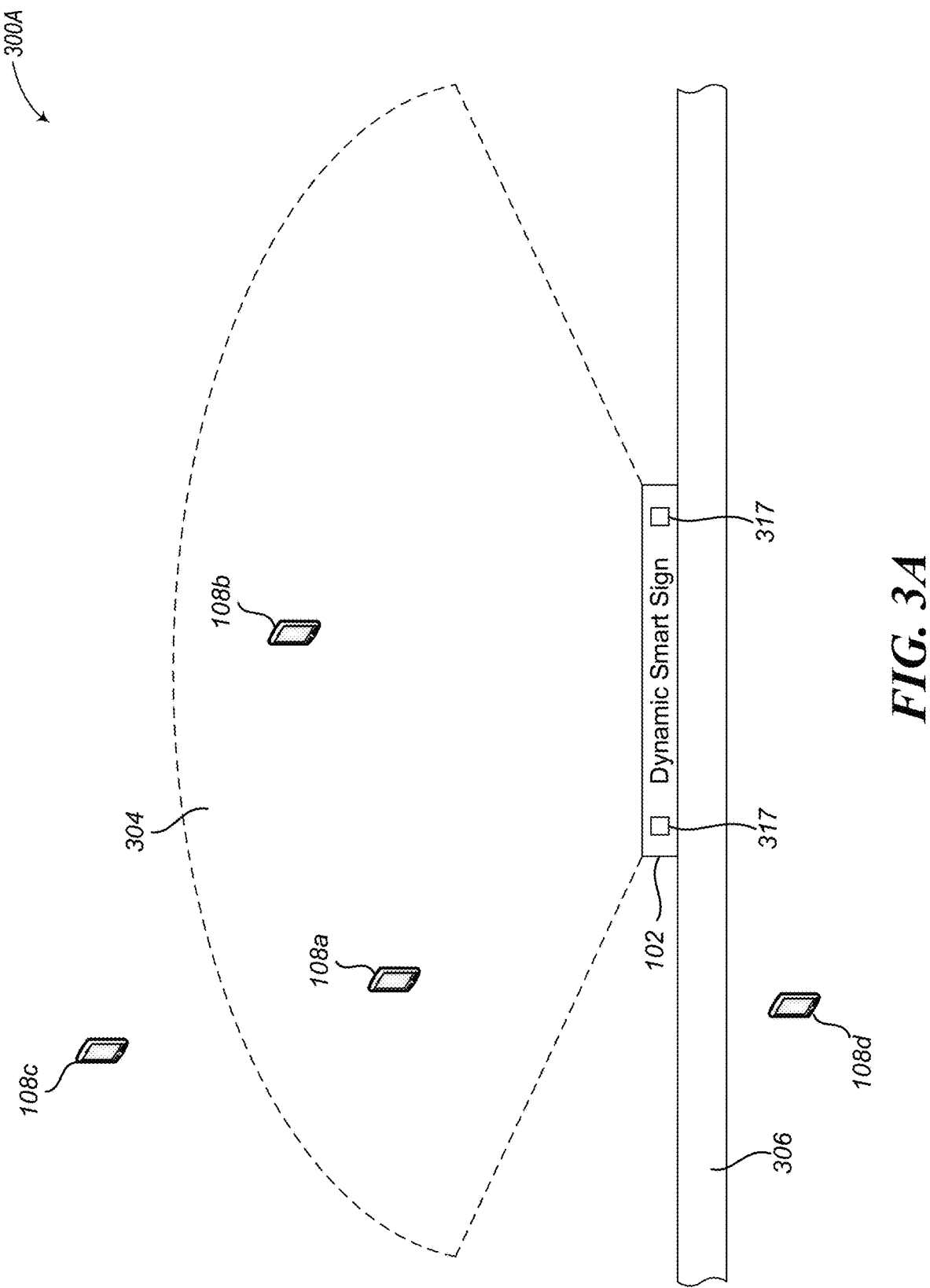
FIGS. 3A-3B show use case examples of a field-of-view area for a dynamic smart sign in accordance with embodiments described here.
Figure 3B:
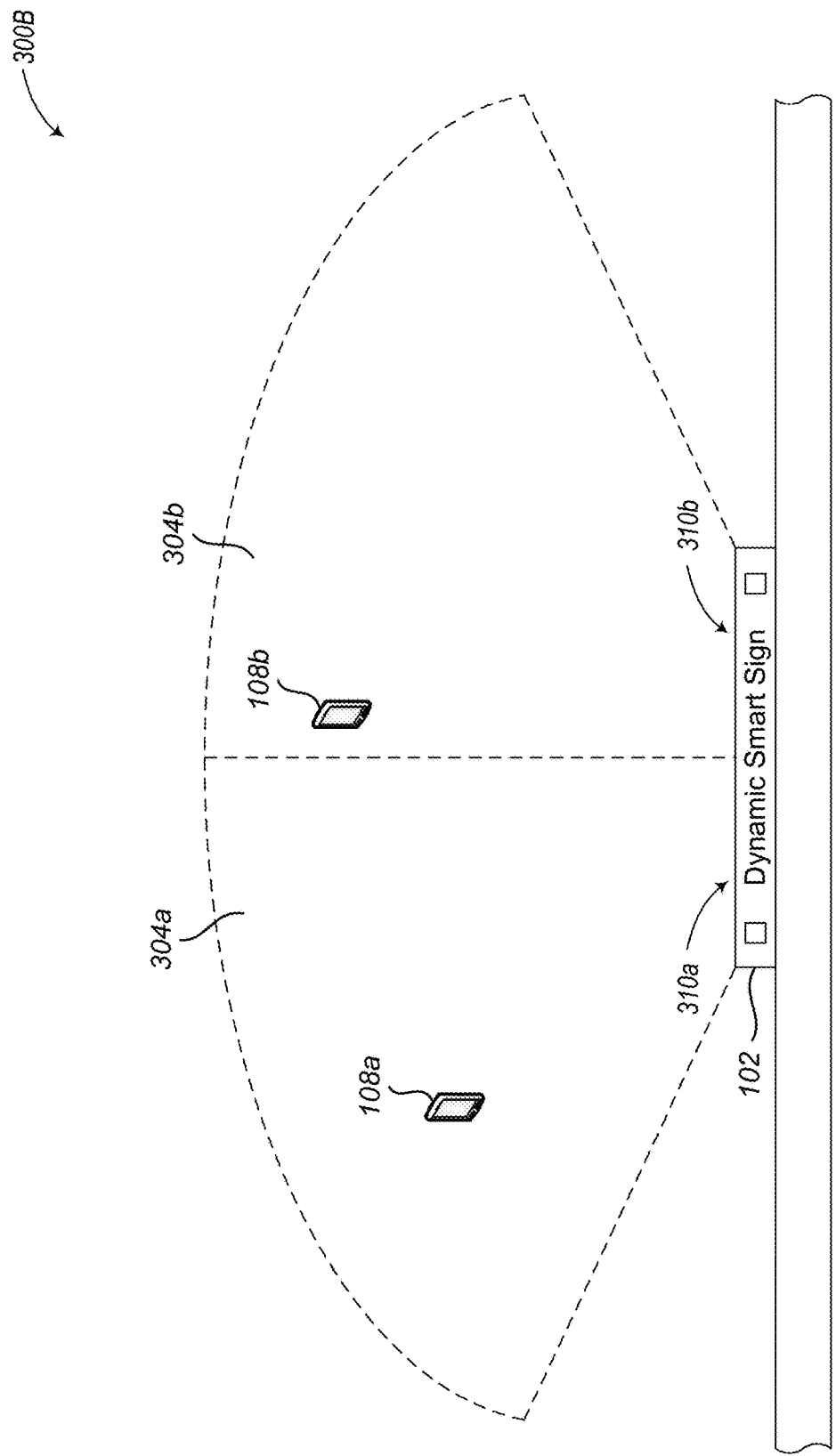

FIGS. 3A-3B show use case examples of a field-of-view area for a dynamic smart sign in accordance with embodiments described herein. FIG. 3A illustrates an example 300A of a dynamic smart sign 102 with a field-of-view area 304. The field-of-view area 304 is a distance or area in which the dynamic smart sign 102 can detect, track, or communicate with a mobile communication device 108. In various embodiments, the field-of-view area 304 is a distance or area in which a user of a mobile communication device 108 can see, view, hear, interact with, or otherwise digest the content provided by the dynamic smart sign 102.

The field-of-view area 304 may be defined or identified as a predetermined distance from the dynamic smart sign 102, an area defined relative to the dynamic smart sign 102, when a mobile communication device 108 is within communication range of the dynamic smart sign 102 via a short-range communication technology, or other spatial relationship between the dynamic smart sign 102 and the mobile communication device 108, or a combination thereof. In some other embodiments, a user is in the field-of-view area 304 when the user touches or otherwise interacts with the dynamic smart sign 102.

In some embodiments, the field-of-view area 304 may be defined as a distance from the dynamic smart sign 102. In at least one embodiment, the dynamic smart sign 102 can determine the distance or location of a mobile communication device 108 relative to the dynamic smart sign 102 using the round-trip time of communications sent between the dynamic smart sign 102 and the mobile communication device 108, ultrasonic sensors, or other sensors that detect a distance between two communicating devices known to one skilled in the art. This detected distance can then be compared to the distance that defines the field-of-view area 304, and if the detected distance is within the field-of-view area 304, then the mobile communication device is in the proximity of the smart sign, otherwise it is not.

In other embodiments, the field-of-view area 304 may be a defined spatial area in a particular position relative to the dynamic smart sign 102. For example, the field-of-view area 304 may be defined as the area in front of the dynamic smart sign 102, but within a predefined radial distance away from the dynamic smart sign 102, such as is illustrated in FIG. 3A. In at least one embodiment, the dynamic smart sign 102 can determine if a mobile communication device 108 is within the field-of-view area 304 by employing one or more directional proximity detectors 317 or sensors to determine a location of the mobile communication device 108 relative to the dynamic smart sign 102. In some embodiments, the relative location of each mobile communication device may be a radial angle or other coordinate system directions that have a corresponding graphical display location.

In yet other embodiments, the field-of-view area 304 may be defined as the area in which a mobile communication device 108 can communicate with the dynamic smart sign 102. In this way, a mobile communication device 108 is in proximity to the dynamic smart sign 102 when the mobile communication device 108 is within communication range of the dynamic smart sign 102 via a short-range communication technology. In various embodiments, the dynamic smart sign 102 is configured to receive signals from or communicate with mobile communication devices 108 via one or more short-range communication technologies, such as via Near Field Communication (NFC) protocols, Bluetooth Low Energy (BLE) protocols, Radio-frequency identification (RFID) technology, or other short-range communication technologies. Receipt of a message or signal from a mobile communication device 108 using a short-range communication technology may indicate that the mobile communication device 108 is in the field-of-view area 304 of the dynamic smart sign 102.

Various range and directional proximity detectors 317, sensors, devices, technologies, or mechanisms known to those skilled in the art can be used to logically define or identify the field-of-view area 304. For example, such proximity detectors are widely used in cars for detecting mobile devices both inside and outside but proximate to the car. It should be noted that one or more proximity detectors 317 may be built into the dynamic smart sign 102 or positioned remote to the smart sign but in a way that can define the field-of-view area 304, such as in or on an adjacent or nearby wall, pillar, or fixture, or even in the ceiling or floor. Similarly, it should be noted that the field-of-view area 304 may take on various geometrical shapes, such as circular, semicircular, rectangular, triangular, or other polygons. The shape the field-of-view area 304 may be determined based on the type of sensors or technology used to detect or communicate with the mobile communication devices 108, the number of sensors used, or the positioning of the sensors relative to each other or the dynamic smart sign 102.

In some embodiments, a user is in the field-of-view area 304 when the user touches or otherwise interacts with the dynamic smart sign 102. In at least one of various embodiments, the dynamic smart sign 102 may determine the location of the user relative to the dynamic smart sign 102 based on where the user touches the dynamic smart sign 102. In various embodiments, the dynamic smart sign 102 may not communicate with the mobile communication devices 108 in the field-of-view area 304 until a user touches or otherwise interacts with the dynamic smart sign 102, such as by talking to the dynamic smart sign 102 or having the mobile communication device 108 provide information to the dynamic smart sign 102 in response to a user input on the mobile communication device 108. Once the user interacts with the dynamic smart sign 102, the dynamic smart sign 102 initiates communications between the dynamic smart sign 102 and the mobile communication device 108 of the user. The mobile communication device 108 provides its device-specific information to the dynamic smart sign 102. And the smart sign generates and displays user-specific content to the user while the user continues to interact with the dynamic smart sign 102 or for a predetermined period of time. Similarly, the dynamic smart sign 102 can remove the user-specific content from the display of the dynamic smart sign 102 after a predetermined time period has lapsed since the user last interacted with the dynamic smart sign 102. In various embodiments, the dynamic smart sign 102 may periodically, at predetermined times, or randomly communicate with the mobile communication devices 108 in the field-of-view area 304 to determine if the same user is interacting with the smart sign or if the user has exited the field-of-view area 304.

In various embodiments, the field-of-view area 304 may be preset by an administrator or determined by the smart sign. In at least one embodiment, the smart sign may utilize ultrasonic sensors, rangefinders, or other sensors to determine the environment around the smart sign, such as walls, hallways, etc., to determine the field-of-view area 304, such as at what distance or area can a user properly view the dynamic smart sign 102.

In other embodiments, the field-of-view area 304 is predetermined or set by an administrator based on the purpose of the dynamic smart sign 102, what content is being displayed on the dynamic smart sign 102, the location of the dynamic smart sign 102, or other environmental factors associated with the dynamic smart sign 102. For example, in some situations, the dynamic smart sign 102 may be in a location where it only wants to provide user-specific content to those users that are within arm's reach of the dynamic smart sign 102 or who are actually interacting with, e.g., touching, the smart sign, such as in an airport. In this type of situation, the dynamic smart sign 102 would only want to obtain device-specific information from the mobile communication devices 108 that are in front of and less than a meter away from the smart sign and not behind or to the side of the dynamic smart sign 102. In other situations, the smart sign may want to provide user-specific content to those users that are within arm's reach of the dynamic smart sign 102 or at least within a few meters of the dynamic smart sign 102, such as in a hotel room or cruise-ship cabin. In this type of situation, the dynamic smart sign 102 would only want to obtain the device-specific information from mobile communication devices 108 in that particular room or cabin and not in an adjacent room or cabin, or even in the hall.

In some other situations, the dynamic smart sign 102 may be in a location where it wants to obtain device-specific information from mobile communication devices that are within a predetermined distance in all directions around the dynamic smart sign 102, such as in a football stadium. In this type of situation, the dynamic smart sign 102 may be positioned on a pillar in the middle of a corridor in the football stadium. In this example, the dynamic smart sign 102 may want to obtain the device-specific information from the mobile communication devices 108 that are all around the sign, even if a user of a mobile communication device 108 is not directly in front of the dynamic smart sign 102.

By collecting the device-specific information from mobile communication devices 108 that are in the field-of-view area 304, whether in front of or behind the dynamic smart sign 102, the dynamic smart sign 102 can perform additional analytics or operations based on the obtained device-specific information. For example, in some embodiments, the dynamic smart sign 102 can pre-generate user-specific content in anticipation of a mobile communication device 108 moving from behind the sign 102 to the front of the sign 102. In another example, the dynamic smart sign 102 may provide analytical data to the third-party advertisers so that they can adjust bids or bid requirements based on the device-specific information.

It should be noted that, in some embodiments and situations, the users of the mobile communication devices 108 may be able to view the content on the dynamic smart sign 102 before they enter the field-of-view area 304, but that the field-of-view area 304 is some defined area that when a mobile communication device 108 enters this area, the smart sign displays the user-specific content for that mobile communication device. For example, a large sign in a mall could be viewed by a lot of people that are very far away from the sign, but the sign will only display the user-specific content for those people that are closer to the sign. In some embodiments, the size of the field-of-view area 304 may be defined by an administrator or limited by the technology utilized to detect or communicate with the mobile communication devices.

As illustrated in FIG. 3A, the dynamic smart sign 102 is attached to a wall 306, such as in a mall. The illustrated field-of-view area 304 is an area that is substantially in front the dynamic smart sign 102 and has a specific radius from the center of the dynamic smart sign 102. In this example, the field-of-view area 304 is semicircular so as to detect mobile communication devices 108 that are substantially in front of the dynamic smart sign 102, but not behind the wall 306. Embodiments, however, are not so limited and other shapes of field-of-view areas may also be employed.

As shown, mobile communication devices 108a-108c are substantially in front of the dynamic smart sign 102 and mobile communication device 108d is behind the wall 306, such as inside a store but not in front of the sign 102. In this case, mobile communication devices 108a and 108b are within the field-of-view area 304 and can be detected or tracked by, or communicate with, the dynamic smart sign 102, while mobile communication devices 108c and 108d are outside the field-of-view area 304 and cannot be detected or tracked by, or communicate with, the dynamic smart sign 102. Accordingly, the dynamic smart sign 102 is unaware of the presence or location of the mobile communication devices 108c and 108d. However, if mobile communication device 108c is moving towards the dynamic smart sign 102, the dynamic smart sign 102 should be able to detect and communicate with the mobile communication device 108c once it enters the field-of-view area 304.

When a mobile communication device 108 enters the field-of-view area 304, the dynamic smart sign 102 obtains device-specific information from the mobile communication device 108. A user of the mobile communication device 108 presets various permissions and settings of the mobile communication device and the applications on the mobile communication device. The user can determine which device-specific information to share with other devices, such as dynamic smart sign 102. For example, when the user downloads an application for the coffeehouse chain Coffee_A, the user can opt in to receive alerts on the mobile communication device whenever the mobile communication device is near a Coffee_A location. In another example, the mobile communication device may store a variety of personal or device characteristics, and the user can opt in to have them shared with other computing devices. Although these examples refer to the user having to opt in to have the mobile communication device share and receive information from other computing devices, embodiments are not so limited, and some applications or information may be automatically shared or enabled to receive information from other computing devices, such as dynamic smart sign 102.

The dynamic smart sign 102 utilizes the received device-specific information to perform a third-party content auction and generate user-specific content based on the received device-specific information, as described in more detail elsewhere herein. It should be noted that the smart sign may display default content that can be viewed by any user, regardless of whether the smart sign has received any device-specific information from a mobile communication device. The user-specific content can be added to the default content, such as by adding icons, symbols, arrows, or other information to the default content. In other embodiments, the user-specific content may be separately generated content. For example, an advertisement can be generated that is customized for the user, such as by using the user's age, gender, preferred language, application information, or other personal information that is obtained from the user's mobile communication device.

As mentioned above, the field-of-view area 304 is the area in which the dynamic smart sign 102 can detect, track, or communicate with a mobile communication device 108. The field-of-view area 304 may be directional, such as illustrated in FIG. 3A, or it may encompass multiple directions around a dynamic smart sign 102, such as 360 degrees. In some embodiments, the dynamic smart sign 102 may also employ a proximity area (not illustrated) that may partially or fully overlap the field-of-view area 304, or it may be a completely separate area that is remote to the field-of-view area 304 and the dynamic smart sign 102. The proximity area allows the dynamic smart sign 102 to detect and track mobile communication devices 108 before they enter the field-of-view area 304. For example, if a mobile communication device 108 is within the proximity area and not yet in the field-of-view area 304 of the dynamic smart sign 102, then the dynamic smart sign 102 can obtain the device-specific information from that mobile communication device 108 and generate or display the user-specific content prior to the mobile communication device 108 entering the field-of-view area 304.

In some embodiments, the field-of-view area 304 or the proximity area may be utilized to track the movement of mobile communication devices within those areas. In this way, the dynamic smart sign 102 can determine if a mobile communication device 108 is moving in a direction towards the field-of-view area 304 or moving out of the field-of-view area 304. The dynamic smart sign 102 can also utilize the direction of travel and rate of movement to determine if it will adjust the displayed content. For example, if mobile communication device 108b is moving very slowly away from the dynamic smart sign 102 and out of the field-of-view area 304, then this slow movement rate may indicate that the user of the mobile communication device 108b is simply backing up rather than walking away from the sign. In contrast, if mobile communication device 108a is moving very quickly through the field-of-view area 304 and away from the dynamic smart sign 102, then this fast movement away from the dynamic smart sign 102 may indicate that the user of the mobile communication device 108a is walking away from the sign rather than stopping to interact with the dynamic smart sign 102. In this way, the dynamic smart sign 102 may maintain the user-specific content for mobile communication device 108b, but not add the user-specific content for mobile communication device 108a.

In some other embodiments, the proximity area may be remotely located from the field-of-view area 304 such that they do not overlap at all. For example, the system may include a first proximity detector that is remote from the dynamic smart sign 102, which is used to obtain the device-specific information from a mobile communication device 108 and provide it to the dynamic smart sign 102. The dynamic smart sign 102 may include a second proximity detector to determine when the mobile communication device 108 actually enters the field-of-view area 304, at which point the dynamic smart sign 102 displays the user-specific content based on the obtained device-specific information.

One example use case of this type of non-overlapping proximity area and field-of-view area 304 may be in a mall entrance. The dynamic smart sign 102 may be positioned towards the entryway of the mall. The proximity area may be in the entryway itself or the area right outside the doors leading into the entryway and the field-of-view area 304 may be the inside hallway or area between the dynamic smart sign 102 and the entryway. As a user approaches the entryway, the system obtains the device-specific information from mobile communication device of the user and performs an auction based on the device-specific information to generate the user-specific content. Once the user exits the entryway and enters the mall area in front of the smart sign, the smart sign displays the user-specific content, such as an advertisement for a store in the mall and directions to the store relative to the smart sign. Since the user may only be in front of the sign for a short period of time, any delays in generating the user-specific content can result in the user missing the content or forcing the user to pause and wait for the sign to update with the user-specific content. This type of remote, two-stage tracking can improve the user's experience by reducing visual delays in displaying the user-specific content, which can improve the conversion rate of advertisements that are displayed to the users. It should be understood that this two-stage tracking can also be performed when the proximity area is larger than the field-of-view area 304 or where the proximity area overlaps but extends beyond the field-of-view area 304.

FIG. 3B illustrates an example 300B of a dynamic smart sign 102 with a field-of-view area 304. Example 300B is a further illustrative embodiment of example 300A in FIG. 3A, but with the field-of-view area 304 logically separated into multiple portions or sections.

As illustrated, the field-of-view area 304 is separated into field-of-view-area sections 304a and 304b. In this example, the field-of-view-area section 304a is on the right-side of the dynamic smart sign 102 and the field-of-view-area section 304b is on the left-side of the dynamic smart sign 102, from the perspective of the users viewing the dynamic smart sign 102.

In various embodiments, each field-of-view-area section may be associated with a display position on the dynamic smart sign 102 so that the rendered content is closer to users in that section. As illustrated, the field-of-view-area section 304a is associated with a right side 310a of the dynamic smart sign 102 and the field-of-view-area section 304b is associated with a left side 310b of the dynamic smart sign 102, from the perspective of the users viewing the dynamic smart sign 102.

Each mobile communication device in the field-of-view area 304 may be assigned a field-of-view-area section based on their actual locations relative to the dynamic smart sign 102. For example, mobile communication device 108a is located in and assigned to the field-of-view-area section 304a, and mobile communication device 108b is located in and assigned to the field-of-view-area section 304b. By employing embodiments described herein, separate auctions can be performed for each separate field-of-view-area section. Accordingly, user-specific content for the mobile communication device 108b is generated based on device-specific information obtained from the mobile communication device 108b and displayed on the left side 310b of the display screen of the dynamic smart sign 102, and user-specific content for mobile communication device 108a is generated based on device-specific information obtained from the mobile communication device 108a and displayed on the right side 310a of the display screen of the dynamic smart sign 102, both being from the perspective of the users. In this way, separate auctions may be performed for each different mobile communication device in the field-of-view area 304, and different content can be provide to each user of the mobile communication devices.

Although the above example relies on left- and right-field-of-view-area sections, embodiments are not so limited. For example, if both users are in the field-of-view-area section 304a but it is determined that a first user is standing to the right of a second user, from the perspective of the dynamic smart sign 102, then, similar to the previous example, the user-specific content for the first user should be displayed on the left side 310b of the display screen and the user-specific content for the second user should be displayed on the right side 310a of the display screen, both being from the perspective of the users. Similarly, if one user is further away from the dynamic smart sign 102, then the user-specific content for that user can be displayed differently than the user-specific content for a user that is standing right next to the sign.

It should be recognized that embodiments are not limited to logically separating the field-of-view area 304 into only one or two sections. Rather other numbers and arrangements of logical-field-of-view-area sections may be utilized. For example, the smart sign may utilize two or more lateral sections, two or more medial sections, or a combination thereof to present a plurality of advertisements that are specifically tailored to the users of the mobile communication devices in the field-of-view area 304 of the dynamic smart sign 102.

Further descriptions of dynamic smart signs utilizing a field-of-view area or proximity area and their uses are described in more detail in U.S. patent application Ser. No. 15/153,542, filed May 12, 2016; and U.S. patent application Ser. No. 15/175,891, filed Jun. 7, 2016, both of which are herein incorporated by reference in their entirety. Embodiments described in those applications can be readily combined with embodiments described herein to further expand the present disclosure. For example, the dynamic smart sign 102 described herein can utilize the functionality of the dynamic smart sign 102 described in those references to personalize the displayed content by translating the user-specific content displayed on the smart sign or by enabling multi-user interactions with the smart sign based on device-specific information obtained from mobile communication devices in proximity to the smart sign.

Figure 4:
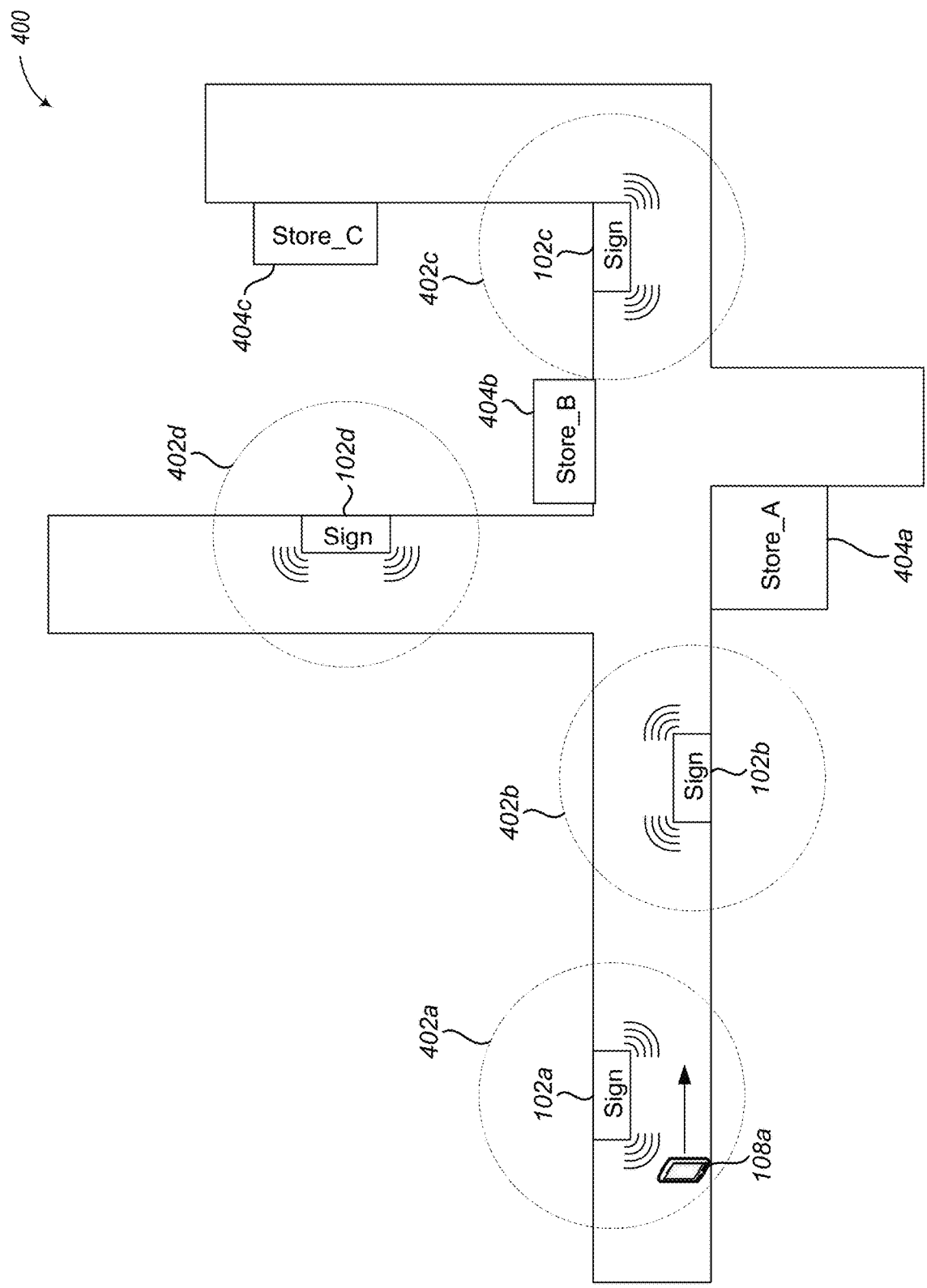
FIG. 4 shows a use case example of a building that is utilizing a plurality of dynamic smart signs in accordance with embodiments described herein.

FIG. 4 shows a use case example of a building that is utilizing a plurality of dynamic smart signs in accordance with embodiments described herein. Example 400 shows a top-down view of a building, such as a mall, that is utilizing a plurality of dynamic smart signs 102 to perform real-time auctions and provide information to people walking through the mall. In this example, stores 404a-404c are third-party content providers 110.

Each dynamic smart sign 102a-102d includes a proximity 402a-402d, respectively. The proximities 402 of the dynamic smart signs 102 may overlap or they may be separated by some distance, as illustrated. Similarly, the proximity 402 may be virtually any geometrical shape that is determined by the proximity sensors used by each respective dynamic smart sign 102.

In this illustration, a mobile communication device 108a has entered the proximity 402a of the dynamic smart sign 102a. Utilizing embodiments described herein, the dynamic smart sign 102a obtains device-specific information from the mobile communication device 108a and performs an auction to determine which store 404 is offering the highest amount of money to have its content displayed on the smart sign for the received device-specific information.

In one non-limiting example, stores 404a and 404c may be athletic apparel stores, and store 404b may be a newsstand. Each store may provide a bid to have its own advertisement displayed on dynamic smart sign 102a when a mobile communication device 108 enters the proximity 402 having a running-magazine application installed thereon, e.g., store 404a bids $2.00, store 404b bids $1.00, and store 404c bids $0.50. If the mobile communication device 108a has installed an application for a running magazine, then the dynamic smart sign 102a may display the advertisement for store 404a because it had the highest bid. It should be recognized that the stores 404, or third-party content providers can provide restrictions on their bids, such as, but not limited to, not to exceed dollar amounts in a given time period, not to exceed number of displays in a given time period, a range of dollar amounts with a minimum number of displays in a given time period, or other constraints on how much or how often to bid on having their content displayed on a dynamic smart sign 102.

In some embodiments, the dynamic smart sign 102a may determine that the mobile communication device 108a is moving towards dynamic smart sign 102b. In at least one such embodiment, the dynamic smart sign 102a may provide the device-specific information of mobile communication device 108a to the dynamic smart sign 102b prior to the mobile communication device 108a entering the proximity 402b of the dynamic smart sign 102b. The dynamic smart sign 102b can display the content resulting from the auction performed by the dynamic smart sign 102a or it can perform its own separate auction prior to or when mobile communication device 108a enters its proximity 402b.

Continuing the example above, each of stores 404 may provide the same or different bids for dynamic smart sign 102b than they did for dynamic smart sign 102a. For example, store 404c may bid $4.00, store 404b may bid $1.00, and store 404a may bid $0.50. Stores 404a and 404b may be visible to a user standing in the proximity 402b of the dynamic smart sign 102b; therefore, they may bid less with dynamic smart sign 102b than they did with dynamic smart sign 102a. In contrast, store 404c may increase its bid in an attempt entice users to bypass stores 404a and 404b and continue to store 404c. In this example, the dynamic smart sign 102b can utilize the device-specific information from mobile communication device 108a, whether collected by dynamic smart sign 102a or dynamic smart sign 102b, to determine to display an advertisement for store 404c.

The above examples should not be construed as exhaustive or limiting and other numbers of dynamic smart signs or third-party content providers may be employed in a variety of different environments and settings. Similarly, third-party content providers can provide a variety of different bids or device-information requirements to be used by the dynamic smart signs in performing third-party-content auctions.

The operation of certain aspects of the disclosure will now be described with respect to FIGS. 5-7. In at least one of various embodiments, processes 500, 600, and 700 described in conjunction with FIGS. 5-7, respectively, may be implemented by or executed on one or more computing devices, such as dynamic smart sign 102.

Figure 5:
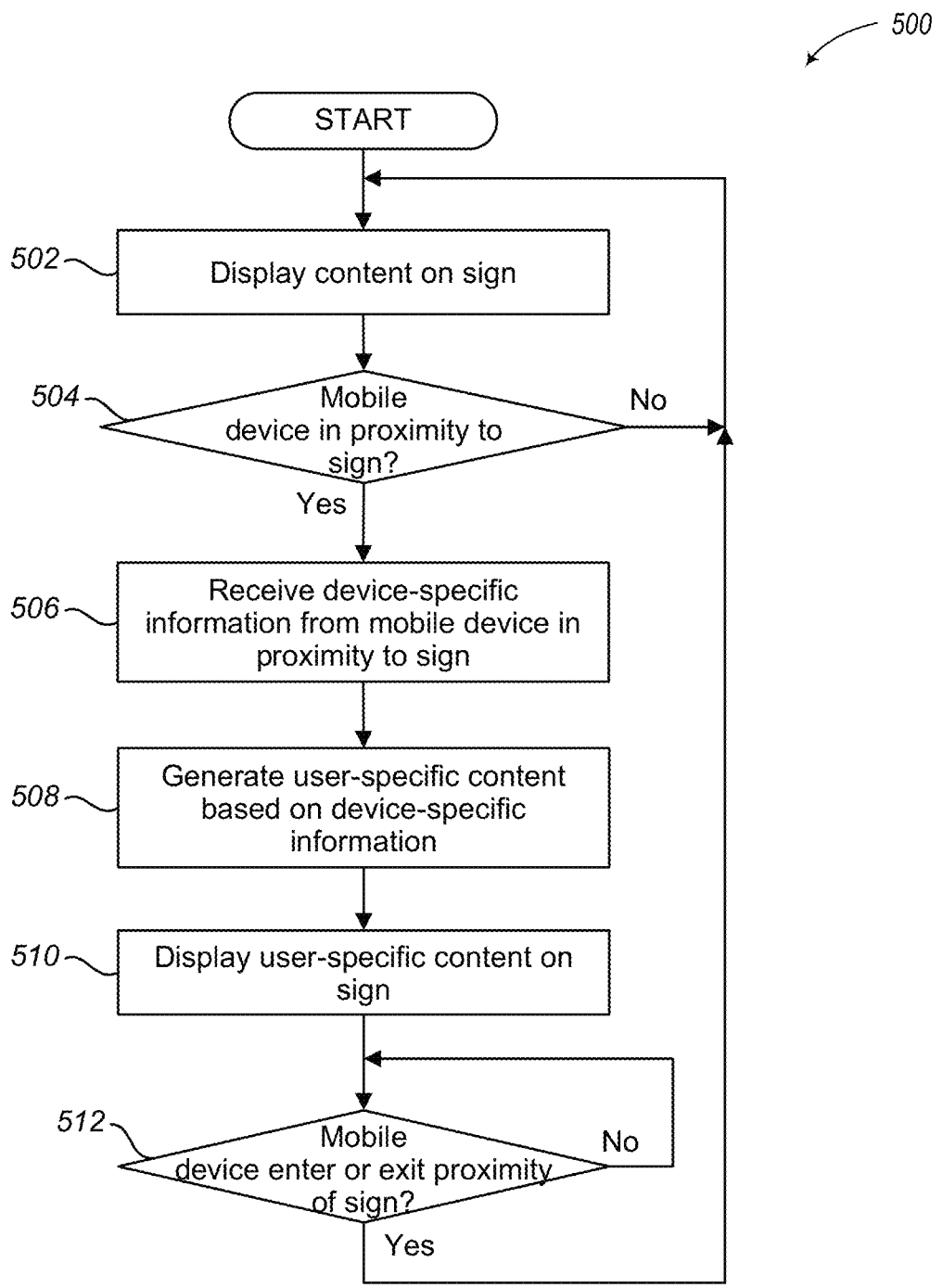
FIG. 5 illustrates a logical flow diagram generally showing one embodiment of an overview process for dynamically providing user-specific content on a smart sign based on device-specific information associated with one or more mobile communication devices in close proximity to the sign in accordance with embodiments described herein.

FIG. 5 illustrates a logical flow diagram generally showing one embodiment of an overview process for dynamically providing user-specific content on a smart sign based on device-specific information associated with one or more mobile communication devices in close proximity to the sign in accordance with embodiments described herein.

Process 500 begins, after a start block, at block 502, where content is displayed on a smart sign, such as dynamic smart sign 102. In some embodiments, the content is stored on the smart sign. In other embodiments, the content is provided to the smart sign by a server or some other computing device, such as dynamic-smart-sign server 114.

In various embodiments, the content that is initially displayed on the smart sign, or displayed when no mobile communication devices are in its proximity, is default content for the smart sign. For example, the default content may be a map, store or restaurant information, advertisements, or other content.

Process 500 proceeds to decision block 504, where a determination is made whether there are any mobile communication devices in proximity to the smart sign. In various embodiments, the smart sign is configured to detect the presence of one or more mobile communication devices that are in proximity to the dynamic smart sign 102, such as by using a beacon or other proximity detector.

A mobile communication device is in proximity to the smart sign when the mobile communication device is within a predetermined proximity distance from the smart sign, within communication range of the smart sign via a short-range communication technology, in a predetermined location relative to the smart sign, a user of the mobile communication device is touching or otherwise interacting with the smart sign, or a combination thereof. In various embodiments, the proximity of the smart sign is pre-determined or set by an administrator based on the purpose of the smart sign, what content is being displayed on the smart sign, the location of the smart sign, or other the environmental factors associated with smart sign. In some embodiments, a mobile communication device is in proximity to the smart sign when the mobile communication device is within the visual field of display of the dynamic smart sign 102, such as the field-of-view area 304, as described elsewhere herein.

If there is one or more mobile communication devices in the proximity of the smart sign, then process 500 flows to block 506; otherwise, process 500 loops to block 502 to display the default content. Since users can move around and come and go from the proximity of the smart sign, the smart sign is periodically, continuously, or at predetermined times checking to determine if mobile communication devices have left the proximity of the smart sign or if new mobile communication devices have come in the proximity of the smart sign. Accordingly, the smart sign is dynamically determining which mobile communication devices are in proximity to the smart sign, and if there are no mobile communication devices in the proximity of the smart sign, the smart sign returns to displaying default content at block 502.

At block 506, device-specific information is received from each mobile communication device that is in the proximity of the smart sign. In various embodiments, the device-specific information from a mobile communication device includes one or more settings or information associated with that mobile communication device. Mobile communication devices can have a variety of different privacy settings that define what information the mobile communication device can provide to other devices, with or without the user's knowledge. In some embodiments, the device-specific information of the mobile communication device may be provided to the smart sign by the mobile communication device without the user's knowledge. In other embodiments, the user may have to opt in to have its mobile communication device provide its device-specific information to the smart sign.

As described elsewhere herein, the device-specific information from a mobile communication device includes demographic information of a user of the mobile communication device, interests of the user of the mobile communication device, information from or about application(s) installed or executing on the mobile communication device, or other information that personalizes the mobile communication device for the user of that mobile communication device.

In various embodiments, the smart sign may receive the device-specific information from a mobile communication device when the mobile communication device comes within communication range of the smart sign. In some embodiments, the mobile communication device may be periodically broadcasting information that can be received by other devices. The mobile communication device may be broadcasting the device-specific information itself or it may be broadcasting its identifier such that the smart sign can respond to the mobile communication device and request the device-specific information.

In other embodiments, the mobile communication device may not be broadcasting any information, but the smart sign may poll mobile communication devices that are within communication range of the smart sign to provide their device-specific information. In some embodiments, the smart sign may poll a mobile communication device for its device-specific information when a user interacts with the smart sign. In other embodiments, the smart sign may periodically transmit requests for mobile communication devices that are within communication range of the smart sign to respond to the smart sign with its device-specific information. In various embodiments, the smart sign and the mobile communication device may establish a communication link between the devices, such that the smart sign can request the device-specific information from the mobile communication device and the mobile communication device can respond to the smart sign with the device-specific information of the mobile communication device.

In various embodiments, a plurality of mobile communication devices may be determined at decision block 504 to be in proximity to the smart sign at any given point in time. The smart sign obtains or otherwise receives the device-specific information of each separate mobile communication device that is in proximity to the smart sign. Accordingly, a plurality of device-specific information (which may be the same or different from one another) are received from the plurality of mobile communication devices.

Process 500 proceeds to block 508, where user-specific content is generated based on the device-specific information received from the mobile communication devices in proximity to the smart sign, which is described in more detail below in conjunction with FIGS. 6 and 7. Briefly, however, the smart sign conducts an auction-based assessment of third-party content providers to determine which third-party content provider has bid the highest to provide content to users of mobile devices that have the device-specific information that was received at block 506.

Process 500 continues at block 510, where the user-specific content is displayed on the smart sign. In various embodiments, the user-specific content may be added to the currently displayed content or it may at least partially overlay or replace the currently displayed content.

Process 500 proceeds next to decision block 512, where a determination is made whether a mobile communication device has entered the proximity of the sign, or if a mobile communication device that was in the proximity of the smart sign has exited the proximity of the smart sign.

In various embodiments, decision block 512 may employ embodiments of decision block 504 to determine if there is a new mobile communication device in the proximity of the smart sign. In one non-limiting example, the smart sign may receive a mobile communication device identifier from each mobile communication device that it communicates with and store it while the mobile communication device is within the proximity of the smart sign. As the smart sign checks to determine which mobile communication devices are in its proximity, if the smart sign receives any new identifiers, then those mobile communication devices are determined to be new mobile communication devices in the proximity of the smart sign.

In some embodiments, a mobile communication device may have exited the proximity of the smart sign if the smart sign is no longer in communication with the mobile communication device, if the user of the mobile communication device has stopped interacting with the smart sign, if a predetermined amount of time has lapsed, or any combination thereof.

In various embodiments, the smart sign periodically, continuously, or at predetermined times checks to determine if a mobile communication device has entered or exited the proximity of the smart sign. If a mobile communication device has exited the proximity of the smart sign, then process 500 loops to block 502; otherwise, process 500 loops to decision block 512 to continue to monitor for mobile communication devices entering or exiting the proximity of the smart sign.

By looping to block 502 when a mobile communication device has entered or exited the proximity of the smart sign, the smart sign can obtain the device-specific information from the mobile communication devices that are currently in the proximity of the smart sign and re-execute the auction process described herein to generate user-specific content for those mobile communication devices that are currently in the proximity of the smart sign.

For example, assume Store_A will pay $5.00 to have its advertisement displayed when there are at least four mobile communication devices with Application_A installed thereon and Store_B will pay $3.00 to have its advertisement displayed when there are three mobile communication devices with Application_A installed thereon. If there are three mobile communication devices in the proximity of the smart sign and they each have installed thereon Application_A, then the smart sign will display Store_B's advertisement. But if another mobile communication device having Application_A installed thereon enters the proximity of the smart sign, then the smart sign will remove Store_B's advertisement and display Store_A's advertisement. Similarly, if one of those mobile communication devices leaves the proximity of the smart sign, resulting in three mobile communication devices in the proximity of the smart sign, then the smart sign will re-display Store_B's advertisements.

It should be understood that the smart sign may include a variety of different timing mechanisms on how often to change the displayed content, how often the same content can be redisplayed in a given period of time, how long to display the content before it is changed, etc. Similarly, content providers can include timing restrictions with their bid to have their content displayed on the smart sign. Furthermore, content from multiple third-party content providers may be simultaneously displayed for at least some period of time.

In some embodiments where a mobile communication device has exited the proximity of the smart sign, the user-specific content for the user of the mobile communication device that has exited the proximity of the smart sign is removed from the displayed content. In various embodiments, only the user-specific content for the mobile communication device that is no longer in the proximity of the smart sign is removed. In at least one embodiment, the default content is re-displayed when the mobile communication devices exit the proximity of the smart sign.

Figure 6:
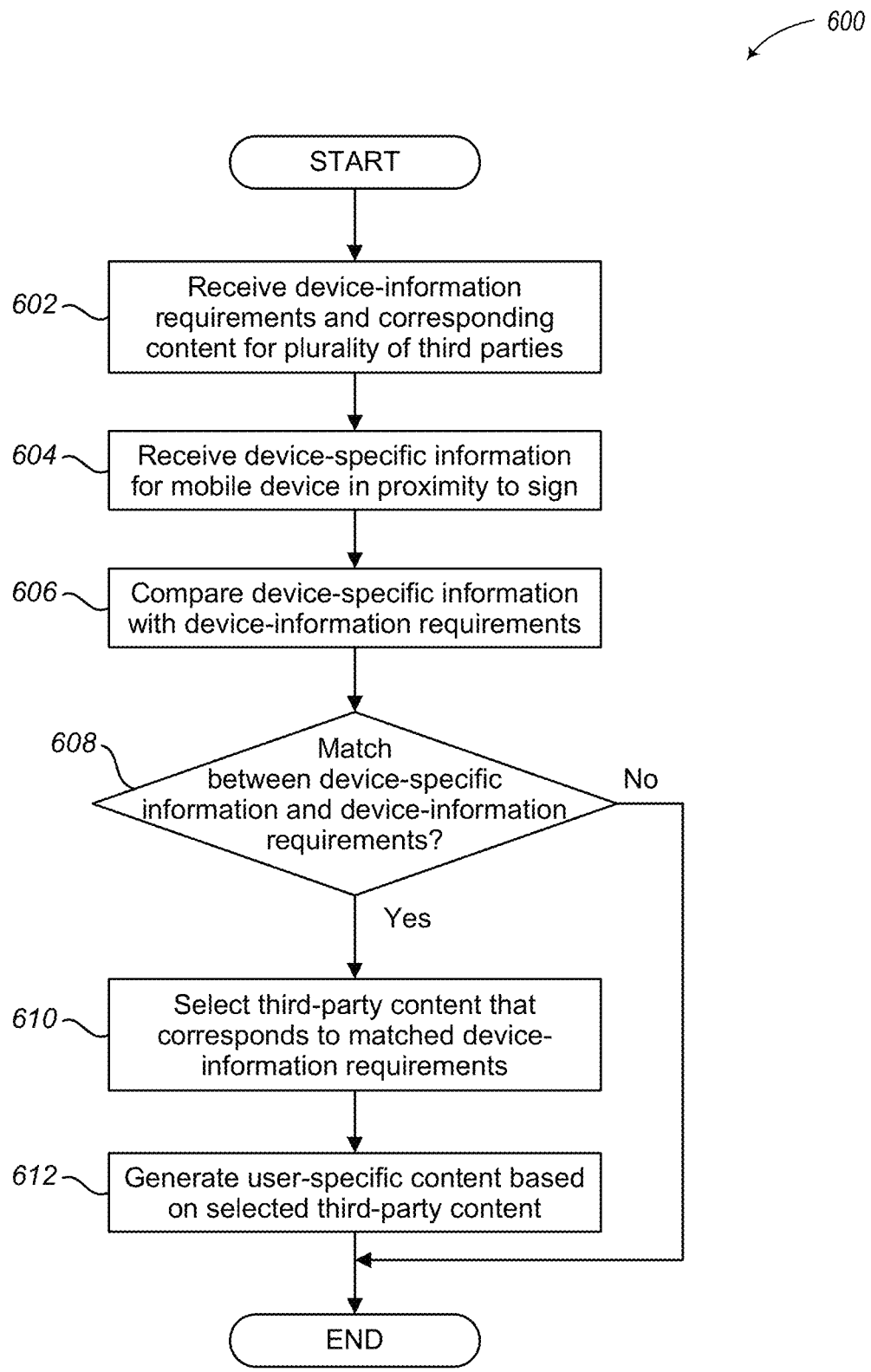
FIG. 6 illustrates a logical flow diagram generally showing one embodiment of a process for selecting third-party content to generate user-specific content to display on the smart sign in accordance with embodiments described herein.

FIG. 6 illustrates a logical flow diagram generally showing one embodiment of a process for selecting third-party content to generate user-specific content to display on the smart sign in accordance with embodiments described herein. Process 600 begins, after a start block, at block 602, where device-information requirements and corresponding content is received from a plurality of third-party content providers, such as third-party content providers 110 in FIG. 1. The device-information requirements for a third-party content provider is the bid placed by the third-party content provider. It includes an amount of money that the third-party is willing to pay to have its content displayed on the smart sign. The device-information requirements also include the target device-specific information or mobile-communication-device characteristics that mobile communication devices in proximity to the smart sign must have before they pay to have their content displayed.

The device-information requirements may also include other limitations or restrictions for each bid. For example, in some embodiments, the device-information requirements may include a minimum or maximum number of mobile devices that can be in the proximity of the smart sign that have the target device-specific information. In other embodiments, the device-information requirements may include a minimum or maximum number of times the content provider's content can be displayed on the smart sign in a given time period, a minimum or maximum dollar amount to bid in a given period of time, or other restrictions. In yet other embodiments, the device-information requirement may include a level of interaction required by a user of the smart sign before that content provider's bid is placed and its corresponding content displayed on the smart sign.

Each third party content provider also provides one or more content to display on the smart sign. In some embodiments, a specific content item may correspond to one or more specific device-information requirements. In other embodiments, a plurality of content items may correspond to a specific device-information requirement. In this way, the smart sign can select content from the plurality of content items, either randomly or in a predetermined order, each time that corresponding device-information requirement is selected to win the auction.

Process 600 proceeds to block 604, where the device-specific information is received from a mobile communication device in the proximity of the smart sign, which is described in more detail above, e.g., at block 506 in FIG. 5.

Process 600 continues at block 606, where the device-specific information is compared with the device-information requirements provided by the third-party content providers. In various embodiments, the device-specific information received from the mobile communication device is compared to the target device-specific information in each device-information requirement to determine if there is a match between the information.

Process 600 proceeds next to decision block 608, where a determination is made whether there is a match between the device-specific information and the device-information requirements. If there is a match, process 600 flows to block 610; otherwise, process 600 terminates or returns to a calling process to perform other actions. In some embodiments, if there is no match between the device-specific information and the device-information requirements, the smart sign may display default content or other advertisements that are not targeted to the specific user in the proximity of the smart sign.

At block 610, third-party content is selected based on the matched device-information requirements. In some embodiments, only one device-information requirement may match the device-specific information, in this case, content associated with matched device-information requirements is selected. In other embodiments, a plurality of device-information requirements for different third-party content providers may match the device-specific information. In this case, the device-information requirements or the third-party content that provided the highest bid amount is selected as the winning bid, and content associated with the winning bid is selected for display.

Process 600 proceeds next to block 612, where user-specific content is generated based on the selected third-party content. The user-specific content may be text, graphics, symbols, video, audio, or other information or content that is personalized for a user based on the selected third-party content. Examples of user-specific content can include, but is not limited to, advertisements, directions to stores or restaurants, restaurant menus, descriptive information, or other content or information. In some embodiments, the user-specific content may be separate and different from the initially displayed content. In other embodiments, the user-specific content may be the initially displayed content but personalized for that user based on the selected third-party content.

In some embodiments, the user-specific content is generated by adding the selected third-party content to default content or currently displayed content. For example, text, images, icons, symbols, or other graphics associated with or derived from the selected third-party content may be added to the displayed content. In one non-limiting example, the default content may be a map of a mall. Assume the device-specific information received at block 506 indicated that the mobile communication device in the proximity of the smart sign has app for running magazine. By employing embodiments described herein, the smart sign may determine that Store_A in the mall has won the auction to have its content displayed on the smart sign when a user with a mobile communication device that has the running magazine app installed thereon. The user-specific content may be an advertisement for Store_A. In this example, the advertisement may be added to a blank area near the edge of the map or it may be displayed over the map so that it is more visible to someone standing in front of the smart sign.

In other embodiments, the selected third-party content may include instructions for how to modify the currently displayed content. For example, the default content may be modified by highlighting or zooming in on a specific area of the default content, by changing the color or size of text in the default content, or other alterations to the default content. Continuing the example above of the mall, the selected third-party content may include instructions to generate the user-specific content by adding and an arrow to the map that points to the location of Store_A in the mall.

In yet other embodiments, the user-specific content may be generated by displayed the selected third-party content separate from the currently displayed content, such as in separate graphical user experiences or interfaces. In some embodiments, the graphical user experience for a user is a content window that includes the user-specific content and is separate from other content that is being displayed. In some embodiments, the user may be enabled to interact with the user-specific content, such as via a graphical user interface.

It should be understood that the above examples are not to be limiting, but are for illustrative purposes, and the user-specific content can be generated based on the selected third-party content in virtually any manner.

After block 612, process 600 terminates or returns to a calling process to perform other actions.

Figure 7:
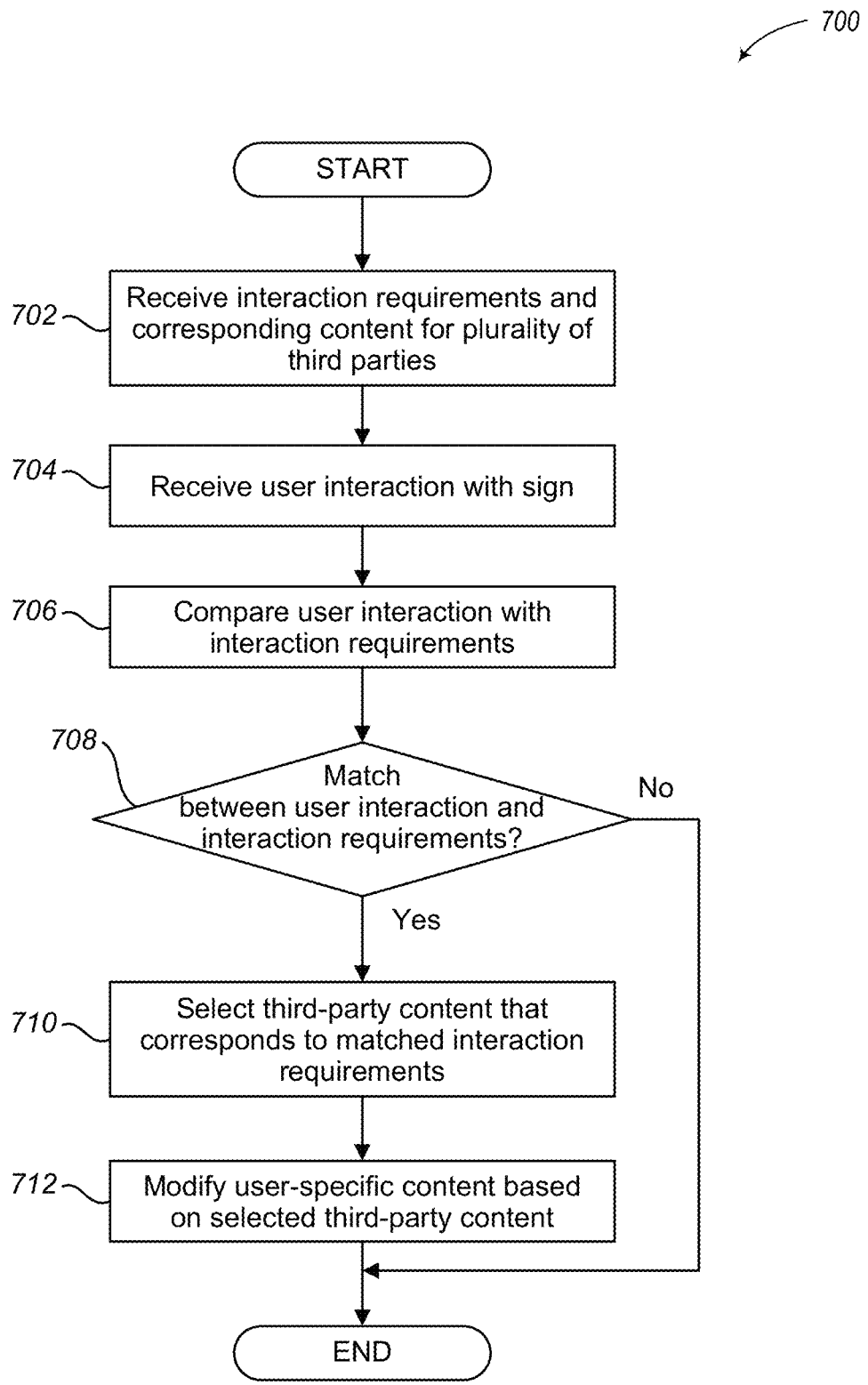
FIG. 7 illustrates a logical flow diagram generally showing one embodiment of a process for receiving user interactions and modifying the user-specific content based on those interactions in accordance with embodiments described herein.

FIG. 7 illustrates a logical flow diagram generally showing one embodiment of a process for receiving user interactions and modifying the user-specific content based on those interactions in accordance with embodiments described herein. In various embodiments, process 700 may be employed in conjunction or cooperation with process 600 in FIG. 6 to select third-party content to display on the smart sign.

Process 700 begins, after a start block, at block 702, interaction requirements and corresponding content are received from a plurality of third-party content providers. In various embodiments, the interaction requirements may be part of or included with the device-information requirements provided by the third-party content providers. As such, the interaction requirements are the bid placed by the third-party content provider when a user is interacting with the smart sign. The interaction requirements include an amount of money that the third-party is willing to pay to have its content displayed on the smart sign for specific or target user interactions.

Process 700 proceeds to block 704, where a user interaction with the smart sign is received. In various embodiments, the user interaction may include user input via a touch display or via an audio input device. For example, the user may click on a specific area of a mall map to see the stores that are in that area. Embodiments, however, are not so limited and other types of user interactions with the smart sign may also be received.

Process 700 continues at block 706, where the user interaction is compared to the interaction requirements. In various embodiments, the received user interaction is compared to the target interactions in each interaction requirement from the plurality of third-party content providers to determine if there is a match between the interactions.

Process 700 proceeds next to decision block 708, where a determination is made whether there is a match between the user interaction with the sign and the interaction requirements. If there is a match, process 700 flows to block 710; otherwise, process 700 terminates or returns to a calling process to perform other actions.

At block 710, third-party content is selected based on the matched interaction requirements. In some embodiments, only one interaction requirement may match the user interaction with the smart sign, in this case, content associated with matched interaction requirement is selected. In other embodiments, a plurality of interaction requirements for different third-party content providers may match the user interaction with the smart sign. In this case, the interaction requirements or the third-party content that provided the highest bid amount is selected as the winning bid, and content associated with the winning bid is selected for display.

In various embodiments, the third-party content may further be selected based on a combination of both a match between the interaction requirements and the user interaction with the sign and a match between the device-information requirements and the device-specific information received from the mobile communication devices in the proximity of the smart sign. Accordingly, process 600 in FIG. 6 and process 700 in FIG. 7 may coordinate the selection of the third-party content in blocks 610 and 710, respectively.

In some embodiments, the device-specific information utilized may be from the mobile communication device of the user that is interacting with the smart sign. In at least one embodiment, the mobile communication device of the user interacting with the sign may be determined from other mobile communication devices in the proximity of the smart sign by utilizing various distancing and ranging techniques known to those skilled in the art, e.g., round-trip time of communications between the smart sign and the mobile communication device of the user, to identify mobile communication devices that are close to the display screen of the smart sign, e.g., less than one meter.

Process 700 proceeds next to block 712, where user-specific content is generated based on the selected third-party content. In various embodiments, block 712 may perform embodiments similar to those described above in conjunction with block 612 in FIG. 6 to generate the user-specific content based on the selected third-party content.

After block 712, process 700 terminates or returns to a calling process to perform other actions.

It should be understood that the embodiments described in the various flowcharts may be executed in parallel, in series, or in a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Figure 8:
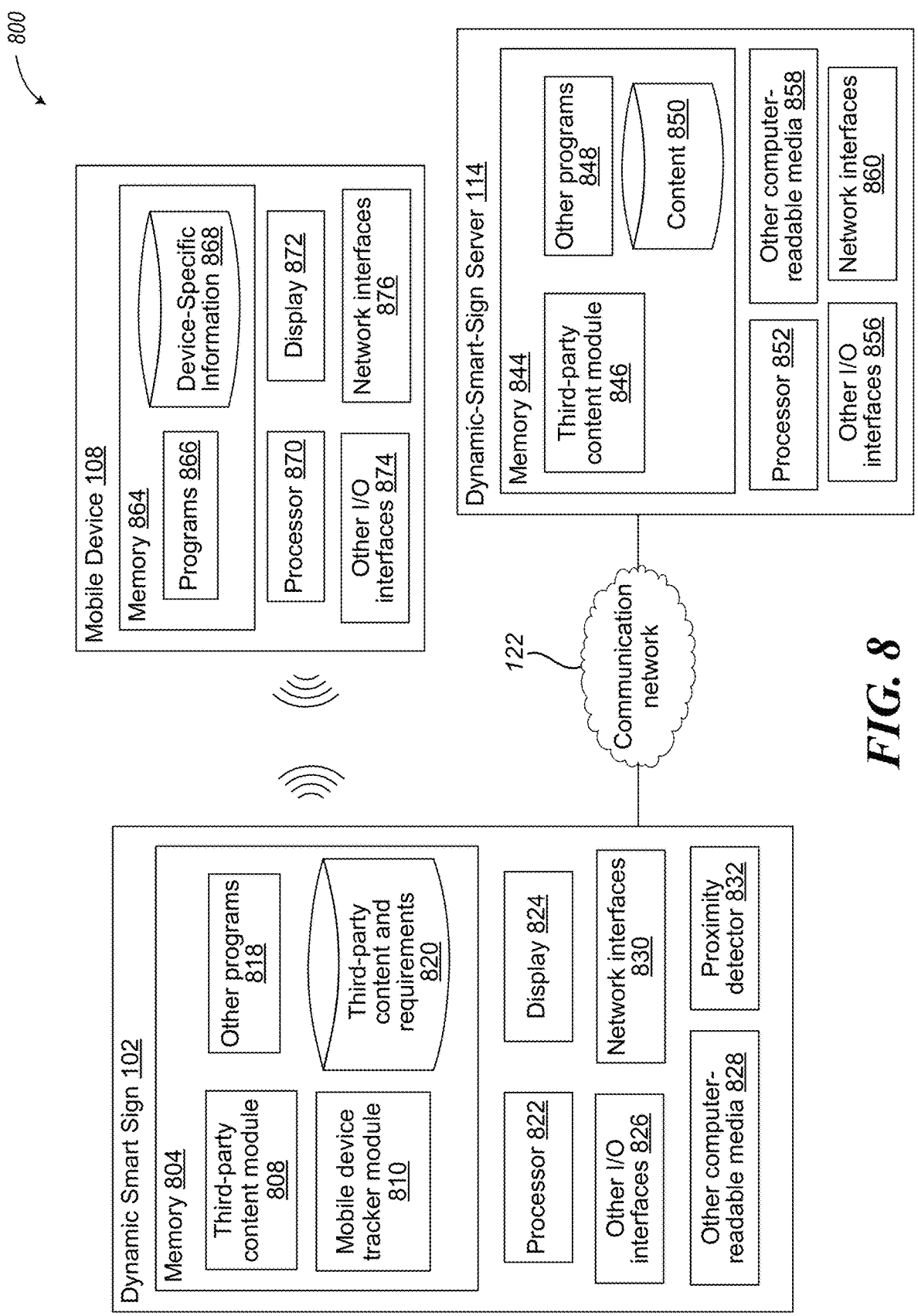
FIG. 8 shows a system diagram that describes one implementation of computing systems for implementing embodiments described herein.

FIG. 8 shows a system diagram that describes one implementation of computing systems for implementing embodiments described herein. System 800 includes a dynamic smart sign 102 and a mobile communication device 108.

One or more special-purpose computing systems are used to implement dynamic smart sign 102 to receive device-specific information from mobile communication devices 108 that are in close proximity to the dynamic smart sign 102, and generate and display user-specific content based on the device-specific information, as described herein. Accordingly, various embodiments described herein may be implemented in software, hardware, firmware, or in some combination thereof. Dynamic smart sign 102 includes memory 804, processor 822, display 824, I/O interfaces 826, other computer-readable media 828, network interface 830, and proximity detector 832.

Processor 822 includes one or more processing devices that execute instructions to perform actions, including at least some embodiments described herein. In various embodiments, the processor 822 may include one or more central processing units (CPUs).

Memory 804 may include one or more various types of non-volatile and/or volatile storage technologies. Examples of memory 804 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 804 may be utilized to store information, including computer-readable instructions that are utilized by processor 822 to perform actions, including at least some embodiments described herein.

Memory 804 may have stored thereon various modules, such as third-party content module 808, mobile communication device tracker module 810, or other programs 818. The mobile communication device tracker module 810 utilizes the proximity detector 832 to determine and track mobile communication devices 108 that are in close proximity to the dynamic smart sign 102. In some embodiments, the mobile communication device tracker module 810 obtains the device-specific information and a location of those mobile communication devices. The third-party content module 808 conducts an auction for advertisers to bid to have their content displayed to the user of the mobile communication device 108 based on device-information requirements of the advertisers and the device-specific information received from the mobile communication device 108, as described herein. The third-party content module 808 generates user-specific content for the users of the mobile communication device 108 based on the results of the auction and the dynamic smart sign 102 displays the user-specific content on the display 824. In some embodiments, the mobile communication device tracker module 810 can execute additional auctions based on user interaction received via inputs from a touch display associated with display 824 or from other I/O interfaces 826.

Memory 804 may also store third-party content and requirements 820. The third-party content and requirements 820 may include a plurality of different content for a plurality of advertisers to provide to users. Each advertiser may have their own separate third-party content to provide to users of mobile communication devices 108. The third-party content and requirements 820 also include device-information requirements of each advertiser, such as which device-specific information to bid on to provide their third-party content and a maximum bid amount. In some embodiments, these advertiser requirements may also include various levels of bids for different user interactions, as described herein.

Proximity detector 832 is a device capable of detecting the presence of one or more mobile communication devices that are in close proximity or within a predetermined range of the dynamic smart sign 102. The proximity detector 832 may be an embodiment of proximity detector 317 in FIG. 1. In some embodiments, the proximity detector 832 is configured to receive signals, such as via Near Field Communication (NFC) protocols, Bluetooth Low Energy (BLE) protocols, Radio-frequency identification (RFID) technology, or other short-range communication technologies. In some embodiments, the dynamic smart sign 102 communicates with the mobile communication devices to receive various user settings and other device-specific information from the mobile communication devices. In some embodiments, the proximity detector 832 can determine range and direction of signals from the mobile communication devices utilizing a variety of ranging techniques known to those skilled in the art. This information is used by the mobile communication device tracker module 810 to determine a location of each corresponding mobile communication device and whether the mobile communication device is moving or has exited the proximity of the dynamic smart sign 102.

Display 824 is a display device capable of rendering content to a user. The display 824 may be a liquid crystal display, light emitting diode, or other type of display device, and include a touch sensitive screen capable of receiving inputs from a user's hand, stylus, or other object.

I/O interfaces 826 may include interfaces for various other input or output devices, such as audio interfaces, other video interfaces, USB interfaces, physical buttons, or the like. Other computer-readable media 828 may include other types of stationary or removable computer-readable media, such as removable flash drives, external hard drives, or the like. Network interfaces 830 are configured to communicate with other computing devices, such as mobile communication device 108 via a communication network (not illustrated). One or more computing systems are used to implement the mobile communication device 108 to provide device-specific information to the dynamic smart sign 102. Accordingly, various embodiments described herein may be implemented in software, hardware, firmware, or in some combination thereof. The mobile communication device 108 includes memory 864, one or more processors 870, display 872, I/O interfaces 874, and network interfaces 876.

Processor 870 includes one or more processing devices that execute instructions to perform actions. In various embodiments, the processor 870 may include one or more central processing units (CPUs).

Memory 864 may include one or more various types of non-volatile and/or volatile storage technologies. In some embodiments, memory 864 may be employ storage technology similar to what is described above for memory 804. Memory 864 may be utilized to store information, such as computer-readable instructions that are utilized by processor 870 to perform actions, including at least some embodiments described herein.

Memory 864 may have stored thereon various programs 866 and device-specific information 868. The programs 866 can include operating system programs, mobile applications, or other programs. The device-specific information 868 includes information, settings, or parameters about the mobile communication device 108, programs 866, or other stored information about a user of the mobile communication device 108. In various embodiments, the mobile communication device 108 provides the device-specific information 868 to the dynamic smart sign 102 when requested by the dynamic smart sign 102 or it may periodically broadcast some or all of the device-specific information 868, which can be captured by the dynamic smart sign 102 when the mobile communication device 108 is within communication range of the dynamic smart sign 102.

I/O interfaces 874 may include interfaces for various other input or output devices, such as audio interfaces, display interfaces, other video interfaces, USB interfaces, or the like. Network interfaces 876 are configured to communicate with other computing devices, such as dynamic smart sign 102 via a communication network (not illustrated).

One or more computing systems are used to implement the dynamic-smart-sign server 114 to receive device-specific information for the mobile communication devices 108 from the dynamic smart sign 102, and in some embodiments generate user-specific content based on the device-specific information and provide the user-specific content to the dynamic smart sign 102 for display, as described herein. Accordingly, various embodiments described herein may be implemented in software, hardware, firmware, or in some combination thereof. The dynamic-smart-sign server 114 includes memory 844, one or more processors 852, I/O interfaces 856, other computer-readable media 858, and network interfaces 860.

Processor 852 includes one or more processing devices that execute instructions to perform actions. In various embodiments, the processor 852 may include one or more central processing units (CPUs).

Memory 844 may include one or more various types of non-volatile and/or volatile storage technologies. In some embodiments, memory 844 may be employ storage technology similar to what is described above for memory 804. Memory 844 may be utilized to store information, such as computer-readable instructions that are utilized by processor 852 to perform actions, including at least some embodiments described herein.

Memory 844 may have stored thereon various modules, such as third-party content module 846 or other programs 848. The third-party content module 846 can communicate with the dynamic smart sign 102 via the communication network 122. The third-party content module 846 can perform embodiments similar to third-party content module 808 of the dynamic smart sign 102. In at least one such embodiment, the third-party content module 846 generates user-specific content for the users of the mobile communication device 108 based on the results of a third-party content auction, and provides the resulting user-specific content to the dynamic smart sign 102 for display on the display 824.

The other programs 848 can include operating system programs or other applications. The memory 844 may also store content 850, which may include third-party content or device-information requirements for third-party content providers.

I/O interfaces 856 may include interfaces for various other input or output devices, such as audio interfaces, display interfaces, other video interfaces, USB interfaces, or the like. Other computer-readable media 858 may include other types of stationary or removable computer-readable media, such as removable flash drives, external hard drives, or the like. Network interfaces 860 are configured to communicate with other computing devices, such as dynamic smart sign 102 via the communication network 122.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a display device that displays visual content;
    a proximity sensor in communication with a processor to determine when one or more mobile communication devices is in a field-of-view area of the display device;
    a memory that stores instructions and device-information requirements for a plurality of third parties, the device-information requirements, for each respective third party, specify corresponding third-party content and a corresponding target number of mobile communication devices to be in the field-of-view area of the display device before the corresponding third-party content is selected for display, the target number being two or greater;
    a communication interface that communicates with the one or more mobile communication devices to receive device-specific information from the mobile communication devices; and
    wherein the processor executes the instructions from the memory to:
        display the visual content on the display device;
        determine that a plurality of mobile communication devices are in the field-of-view area of the display device based on data received from the proximity sensor;
        receive device-specific information from the plurality of mobile communication devices via the communication interface;
        compare the device-specific information to the device-information requirements for the plurality of third parties;
        select third-party content that corresponds to the device-information requirements that matches the device-specific information when the plurality of mobile communication devices meets or exceeds the target number of mobile communication devices;
        generate user-specific content for users of the plurality of mobile communication devices based on the selected third-party content; and
        display the user-specific content on the display device.

2. The system of claim 1, wherein, as part of the selection of the third-party content, the processor further executes the instructions to:
    identify a subset of third parties from the plurality of third parties that have device-information requirements that match the device-specific information;

select, from the subset of third parties, a third party that offered a largest amount of money for the device-information requirements that match the device-specific information; and
select the third party content from content provided by the selected third party.

3. The system of claim 1, wherein, as part of the selection of the third-party content, the processor further executes the instructions to:
select an advertisement for a third party of the plurality of third parties that paid a highest amount of money for the device-information requirements that match the device-specific information.

4. The system of claim 1, wherein, as part of the comparison of the device-specific information to the device-information requirements, the processor further executes the instructions to:
aggregate device-specific information from a plurality of mobile communication devices that are in the field-of-view area of the display device; and
compare the aggregated device-specific information with the device-information requirements for the plurality of third parties.

5. The system of claim 1, wherein the processor further executes the instructions to:
receive a user interaction with the display device; and
select a second third-party content based on the user interaction; and
modify the user-specific content based on the selected second third-party content.

6. The system of claim 1, wherein the device-information requirements for each respective third party of the plurality of third parties include target device-specific information and a price that the respective third party is willing to pay to have its content displayed on the display device when the target device-specific information is received from the corresponding target number of mobile communication devices.

7. The system of claim 1, wherein, as part of the comparison of the device-specific information to the device-information requirements, the processor further executes the instructions to perform an auction to determine which third party of the plurality of third-parties bid a highest amount to have its content displayed on the display device for the device-specific information.

8. The system of claim 1, wherein the processor further executes the instructions to:
receive, via the communication interface, second device-specific information from a second mobile communication device that is in the field-of-view area of the display device;
compare the second device-specific information to the device-information requirements for the plurality of third parties;
select second third-party content that corresponds to the device-information requirements that matches the second device-specific information;
generate second user-specific content for a second user of the second mobile communication device based on the selected second third-party content; and
display the second user-specific content on the display device.

9. A system, comprising:
a database that stores device-information requirements and third-party content for a plurality of third-parties;
a display device that displays content;
a proximity sensor that determines when one or more mobile communication devices is in proximity to the display device; and
a server, wherein the server includes a processor configured to:
receive, from the proximity sensor, an indication that a mobile communication device is in the proximity of the display device;
receive device-specific information from the mobile communication device;
determine a number of mobile communication devices currently in proximity to the display device;
in response to the number of mobile communication devices exceeding a threshold value, determine a third-party from the plurality of third-parties based on a comparison of the device-specific information and the stored device-information requirements;
select third party content for the determined third party;
generate user-specific content for a user of the mobile communication device, the user-specific content includes the selected third party content; and
send the user-specific content to the display device for display on the display device.

10. The system of claim 9, wherein the user-specific content includes an advertisement for the determined third party.

11. The system of claim 9, wherein, as part of the determination of the third-party from the plurality of third-parties, the processor performs an auction to determine which third party of the plurality of third-parties bid a highest amount to have its content displayed on the display device for the device-specific information.

12. The system of claim 9, wherein the processor of the server is further configured to:
receive a user interaction from the display device; and
determine a second third-party from the plurality of third-parties based on the user interaction and the comparison of the device-specific information and the stored device-information requirements;
select second third-party content for the determined second third-party; and
modify the user-specific content based on the selected second third-party content.

13. The system of claim 9, wherein the device-information requirements include a target device-specific information for each of the plurality of third parties and a price that each of the plurality of third parties is willing to pay to have its content displayed on the display device when the target device-specific information is received from the mobile communication device.

* * * * *